(12) United States Patent
Krizik et al.

(10) Patent No.: US 9,462,614 B2
(45) Date of Patent: Oct. 4, 2016

(54) METHOD AND APPARATUS FOR MANAGING GROUP-BASED EMERGENCY NOTIFICATIONS AND ACKNOWLEDGMENTS

(71) Applicant: MOTOROLA SOLUTIONS, INC, Schaumburg, IL (US)

(72) Inventors: Mark A Krizik, Homer Glen, IL (US); Daniel J McDonald, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 208 days.

(21) Appl. No.: 14/298,004

(22) Filed: Jun. 6, 2014

(65) Prior Publication Data
US 2015/0359013 A1    Dec. 10, 2015

(51) Int. Cl.
*H04W 76/00* (2009.01)
*H04W 4/08* (2009.01)
*H04W 84/08* (2009.01)

(52) U.S. Cl.
CPC ............. *H04W 76/007* (2013.01); *H04W 4/08* (2013.01); *H04W 84/08* (2013.01)

(58) Field of Classification Search
None
See application file for complete search history.

(56) References Cited

U.S. PATENT DOCUMENTS

| | | | |
|---|---|---|---|
| 5,740,540 A | 4/1998 | Emmermann | |
| 5,809,018 A * | 9/1998 | Lehmusto | H04M 3/56 340/6.1 |
| 6,118,771 A * | 9/2000 | Tajika | H04L 12/185 370/328 |
| 6,363,425 B1 | 3/2002 | Hook et al. | |
| 7,289,454 B2 | 10/2007 | Bovo et al. | |
| 7,805,125 B2 | 9/2010 | Belmonte et al. | |
| 2004/0146019 A1 * | 7/2004 | Kim | H04W 74/002 370/329 |
| 2004/0190487 A1 * | 9/2004 | Biggs | H04J 3/0652 370/350 |
| 2005/0159132 A1 * | 7/2005 | Wright | H04L 12/58 455/404.1 |
| 2006/0209666 A1 * | 9/2006 | Gerlach | H04L 5/0048 370/203 |
| 2010/0227583 A1 | 9/2010 | Roy et al. | |
| 2011/0299403 A1 * | 12/2011 | Dabbs, III | H04W 4/06 370/241 |
| 2013/0029633 A1 | 1/2013 | Moser et al. | |
| 2013/0322414 A1 | 12/2013 | Chowdhary et al. | |
| 2013/0336111 A1 * | 12/2013 | Vos | H04W 4/06 370/230 |
| 2014/0064177 A1 * | 3/2014 | Anchan | H04W 4/08 370/312 |
| 2014/0200014 A1 * | 7/2014 | Iwai | G08B 27/006 455/450 |
| 2014/0269557 A1 * | 9/2014 | Mechaley, Jr. | H04W 76/007 370/329 |

* cited by examiner

*Primary Examiner* — Faruk Hamza
*Assistant Examiner* — Cassandra Decker
(74) *Attorney, Agent, or Firm* — Daniel R. Bestor (57) ABSTRACT

Group-based emergency notifications and acknowledgments are managed via a radio controller. A request to transmit an emergency notification with acknowledgment to an identified target group of subscriber devices is received at the radio controller from a requesting device. The radio controller identifies one or more base stations actively serving subscriber devices associated with the identified target group and identifies, for each of the identified one or more base stations, active channels including one or more of a control channel associated with the base station and active voice or data channels associated with the base station. The radio controller causes an emergency notification outbound signaling packet (OSP), requesting individual acknowledgment and identifying the target group of subscriber devices, to be broadcast on the identified active channels at the identified one or more base stations. Acknowledgments are forwarded back to one of the requesting device and a dispatch console.

19 Claims, 7 Drawing Sheets

METHOD AND APPARATUS FOR MANAGING GROUP-BASED EMERGENCY NOTIFICATIONS AND ACKNOWLEDGMENTS

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, repeater, and/or access point. Such a RAN typically includes a system infrastructure that generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI, or may operate according to other radio protocols such as Long Term Evolution (LTE) or Third Generation (3G) (3GGP or 3GGP2).

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive auditory data (encoded voice, audio, or audio portions of an audio/video stream) and other types of data in accordance with the designated protocol.

Various LMR systems may operate in either a conventional or trunked configuration. In either configuration, a plurality of subscriber devices are partitioned into separate groups of subscriber devices (e.g., talkgroups) for group-based distribution of audio and/or other data.

In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels to support virtually an unlimited number of groups of subscriber devices. Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all available members assigned to or subscribed to the group move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Group calls may be made between wireless and/or wireline participants in accordance with any particular LMR protocol. Associated and/or subscribed group members for group calls may be statically or dynamically defined. That is, in a first example, a user or administrator working on behalf of the user may indicate to the radio network (perhaps at a call controller, radio controller, zone controller, site controller, or other network device) a list of members of a group at the time of the call or in advance of the call. The group members (e.g., subscriber devices) could be provisioned in the network by the user or an agent, and then provided some form of group identity or identifier, for example. Then, at a future time, an originating user of a subscriber device in a group may cause some signaling to be transmitted indicating that he or she wishes to establish a communication session (e.g., group call) with each of the pre-designated participants in the defined group.

In another example, subscriber devices may dynamically affiliate with a group (and also disassociate with the group) perhaps based on user input, and the switching and/or radio network may track group membership and route new group calls according to the current group membership. Group membership information may be shared with dispatchers via dispatch consoles and/or with certain privileged subscriber devices such as those used by commanders or other qualified users.

One problem that has arisen with the increasing proliferation of group-based wireless subscriber devices is that in the event of a catastrophic event or in anticipation of a pending or likely catastrophic event, a commander, dispatcher, or other user in the radio network may desire to issue an emergency notification to a particular group that requires acknowledgment by each of the subscriber devices of that particular group. For example, an evacuation order may be issued to a firefighter group in response to a partial roof collapse or in anticipation of an expected full or partial roof collapse, and the person or device initiating the evacuation order may like to ensure that every member of the group has received the evacuation order.

However, in RANs in general, and in trunked RANs in particular, where radios may be on a control channel, voice traffic channel, data traffic channel, or otherwise scanning other known channels, it is difficult to reach all members of a particular group and/or confirm receipt of the emergency notification by each member of the particular group. Furthermore, once all members of the particular group have been reached with a request to acknowledge the emergency notification, interference and collisions are likely to occur as all members of the particular group attempt to acknowledge the particular message at substantially a same time. Such issues and occurrences could delay or prevent an initiator of an emergency notification in a trunked RAN from reliably transmitting such emergency notifications to all members of the particular group and reliably receiving acknowledgments indicating whether such notifications had been received by all members of the particular group.

Accordingly, what is needed is an improved method and apparatus for managing group-based emergency notifications and acknowledgments in a trunked RAN.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for managing group-based emergency notifications and acknowledgments in a trunked radio access network (RAN).

In one embodiment, a method for managing group-based emergency notifications and acknowledgments starts with receiving, at a radio controller, a request to transmit an emergency notification with acknowledgment to an identified target group of subscriber devices. The radio controller then identifies one or more base stations actively serving subscriber devices associated with the identified target group and identifies, for each of the identified one or more base stations, active channels including one or more of a control channel associated with the base station and active voice or data channels associated with the base station. The radio controller causes an emergency notification outbound signaling packet (OSP), requesting individual acknowledgment and identifying the target group of subscriber devices, to be broadcast on the identified active channels at the identified one or more base stations.

In another embodiment, a radio controller in a radio system includes a transceiver, a data store, and one or more processors configured to: receive, via the transceiver, a request to transmit an emergency notification with acknowledgment to an identified target group of subscriber devices; identify one or more base stations actively serving subscriber devices associated with the identified target group; identify, for each of the identified one or more base stations, active channels including one or more of a control channel associated with the base station and active voice or data channels associated with the base station; cause, via the transceiver, an emergency notification outbound signaling packet (OSP), requesting individual acknowledgment and identifying the target group of subscriber devices, to be broadcast on the identified active channels at the identified one or more base stations.

In a still further embodiment, a subscriber device comprises a transceiver, a data store, and one or more processors configured to: receive, via the transceiver, an emergency notification; extract, from the emergency notification, a group target identifier and determining, based on the subscriber device's group associations, whether the emergency notification is intended for the subscriber device; extract, from the emergency notification, a window of time for SDs to transmit acknowledgments to the emergency notification; and responsive to determining that the emergency notification is intended for the subscriber device: execute an ergonomic response as a function of the type of emergency indicated in the emergency notification; and responsive to detecting an input indicative of a user acknowledgment of the emergency notification, transmit an acknowledgment to a serving base station at a time determined as a function of the window of time.

Each of the above-mentioned embodiments will be discussed in more detail below, starting with example network and device architectures of the system in which the embodiments may be practiced, followed by an illustration of processing steps and message transmissions executable at a radio controller and a subscriber device to implement the improved method and apparatus for managing group-based emergency notifications and acknowledgments in a trunked RAN. Further advantages and features consistent with this disclosure will be set forth in the following detailed description, with reference to the figures.

1. Network Architecture and Device Structure

Figure 1:
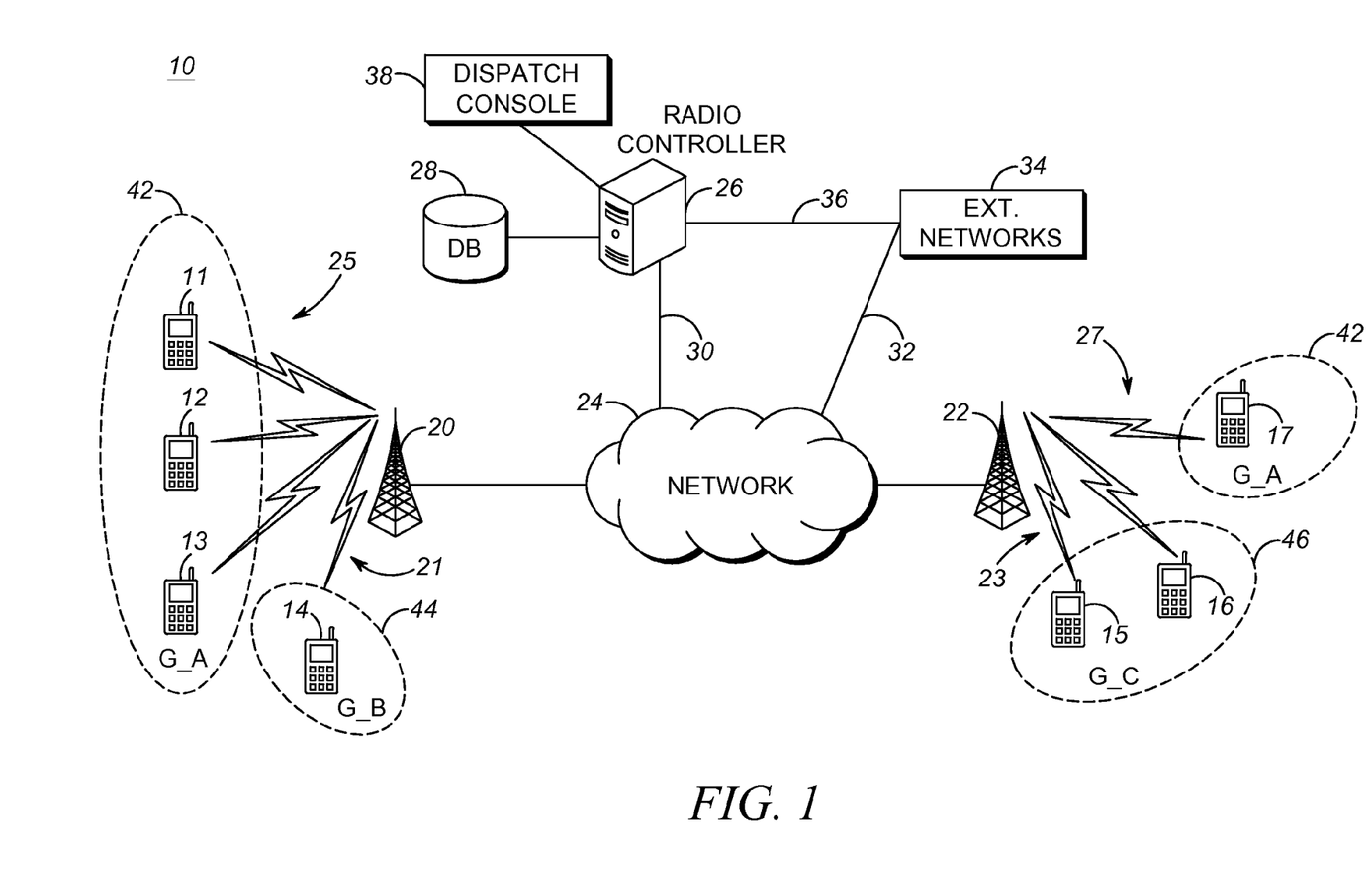
FIG. 1 is a block diagram of a radio access network in accordance with some embodiments.

FIG. 1 illustrates a RAN 10 including client subscriber devices (e.g., SDs) 11-17, fixed terminals 20, 22 (e.g. base stations (BSs)), wireless links 21, 23, 25, 27, backhaul network 24, radio controller 26, database 28, communications connections 30, 32, 36, dispatch console 38, and external networks 34. Each BS 20, 22 has at least one radio transmitter covering a radio coverage cell (not shown). One or several SDs 11-17 within radio coverage of the BSs may connect to the BSs using a wireless communication protocol via wireless links 21, 23, 25, 27. The SDs 11-17 may communicate with each other, and perhaps other devices accessible via other network links, using a group communications protocol over wireless links 21, 23, 25, 27. Wireless links 21, 23, 25, 27 may be, for example, a trunked wireless link supporting a standard or protocol such as ETSI Digital Mobile Radio (ETSI-DMR), Project 25 (P25) standard defined by the Association of Public Safety Communications Officials International (APCO), or other radio protocols or standards. The SDs 11-17 may be configured with an identification reference (such as an International Mobile Subscriber Identity (IMSI)) which may be connected to a physical media (such as a Subscriber Identity Module (SIM) card).

Each SD 11-17 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in RAN 10 allows a single SD, such as SD 11, to communicate with one or more group member SDs (such as SDs 12, 13, 17) associated with a particular group (such as group G_A) at the same time. In the example set forth in FIG. 1, SDs 11-13 and 17 are members of a first group G_A 42, SD 14 is a member of a second group G_B 44, and SDs 15 and 16 are members of a third group G_C 46. In this example, SDs 11-13, 17 in group G_A 42 are being served by two separate BSs 20, 22, while SDs 14-16 in groups G_B 44 and G_C 46 are served by a single respective BS 20, 22.

Although only six SDs, three groups, and two BSs are illustrated in FIG. 1, the present disclosure is not limited as such, and more or fewer SDs, more or fewer groups, and more or fewer BSs could be used in any particular implementation. Furthermore, while a single radio controller 26 is illustrated in FIG. 1, more than one radio controller 26 may be used and/or a distributed radio controller 26 may be used that divides functions across multiple devices, perhaps for load balancing reasons. Finally, while database 28 is illustrated as directly coupled to radio controller 26, database 28 may also be remote from radio controller 26 and accessible to radio controller 26 via one or more of network 24 and/or external networks 34.

The BSs 20, 22 may be linked to the radio controller 26 via network 24 and communications connection 30. Network 24 may comprise one or more BSs, routers, switches, LANs, WLANs, WANs, access points, or other network infrastructure. For example, radio controller 26 may be accessible to BSs 20, 22 via a dedicated wireline or via the Internet. In one example, BSs 20, 22 may be directly coupled to radio controller 26, or to other radio controllers, via one or more internal links. In some embodiments, network 24 may further include a call controller, zone controller, site controller, or other network device for controlling and distributing group auditory and other data amongst SDs via respective BSs.

Radio controller 26 may be a device configured to receive and process incoming emergency notification requests and to receive and process incoming acknowledgments to such emergency notifications, and to correspondingly cause outbound emergency notifications and acknowledgments to be communicated via BSs 20, 22 to which it is communicably coupled. Radio controller 26 may or may not also provide additional functions such as registration, authentication, and/or authorization of SDs for operation within the RAN 10, assignment of channels, assignments of talkgroups, or other functions. In other embodiments, radio controller 26 may be embodied within or coupled to another network device, such as a call controller, zone controller, repeater, site controller, or other network device, existing in network 24, at BSs 20, 22, or elsewhere.

Database 28 may function to store various information, such as subscriber device profiles that may indicate, perhaps based on SD IMSI information, radio ID, IP address, and/or other information, what SDs are authorized for service in RAN 10, what services such SDs are authorized to access, and authentication information for use in authenticating an identity of a particular SD or SD user. Database 28 may also store mappings identifying which SDs belong to which groups for use in routing group auditory and/or other transmissions such as emergency notifications and corresponding acknowledgments.

External networks 34 may also be accessible to BSs 20, 22 (and thus SDs 11-17) via network 24 and communications connection 32 and/or via radio controller 26 and communications connections 30, 36. External networks 34 may include, for example, a public switched telephone network (PSTN), the Internet, or another wireless service provider's network, among other possibilities.

RAN 10 may implement a narrow-band trunked radio communication system in which SDs 11-17 transmit control and data messages in accordance with an air interface protocol such as that defined by the ETSI-DMR or APCO P25 standards. In this embodiment, wireless links 21, 23, 25, 27 may be shared control or traffic channels based on group membership and/or BS. For example, group G_A 42 SDs 11-13 may share a same trunked channel (dynamically assigned code, frequency, and/or timeslot) over wireless link 25 served by BS 20 when G_A 42 has an active call, while the remaining SD 17 of group G_A 42 is assigned a separate wireless link 27 served by a separate BS 22 during the active call. Group G_B 44 SD 14 may use a same or separate assigned trunked channel as G_A 42 SDs 11-13 over wireless link 21 when G_B 44 has in an active call, and group G_C SDs 15 and 16 may share a same or separate trunked channel as G_A 42 SD 17 over wireless link 23 when G_C 46 has an active call. Although not illustrated in FIG. 1, each BS 20, 22 also provides a control channel or rest channel on which SDs 11-17 may idle while awaiting new call notifications and on which other signaling transmissions may occur.

Dispatch console 38 may be directly coupled to radio controller 26 as shown, or may be indirectly coupled to radio controller 26 via one or more of network 24 and external networks 34, or some other network device such as a radio controller in network 24. The dispatch console 38 may provide an administrative or dispatch access to SDs 11-17 and radio controller 26, and allow an administrator or dispatcher to initiate infrastructure-sourced group communications to groups of SDs 11-17 and/or transmit an emergency notification request and track emergency acknowledgments, among other features and functions.

Figure 2:
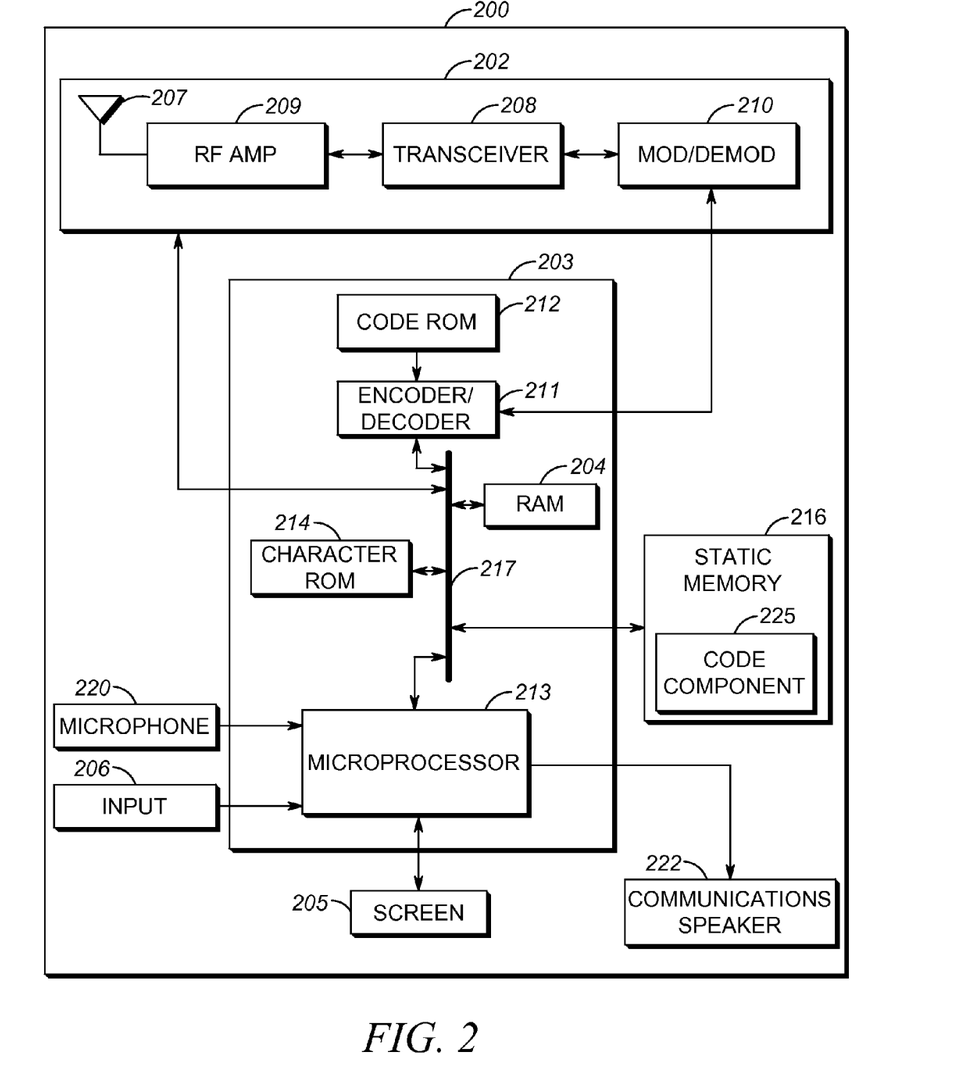
FIG. 2 is a block diagram of a subscriber device in accordance with some embodiments.

Referring to FIG. 2, a schematic diagram illustrates a SD 200 according to some embodiments of the present disclosure. SD 200 may be, for example, the same or similar to SDs 11-17 of FIG. 1. As shown in FIG. 2, SD 200 comprises a radio frequency communications unit 202 coupled to a common data and address bus 217 of a processing unit 203. The SD 200 may also include an input 206 and a display screen 205, each coupled to be in communication with the processing unit 203. A microphone 220 captures audio from a user for encoding and transmission to other users, and a communications speaker 222 reproduces audio from encoded transmissions received from other users.

The processing unit 203 may also include an encoder/decoder 211 with an associated code Read Only Memory (ROM) 212 for storing data for encoding and decoding voice or other signals that may be transmitted or received by the SD 200. The processing unit 203 may further include a microprocessor 213 coupled, by the common data and address bus 217, to the encoder/decoder 211, a character ROM 214, a Random Access Memory (RAM) 204, and a static memory 216.

The radio frequency communications unit 202 is a combined receiver and transmitter (e.g., transceiver) having a common antenna 207. The radio frequency communications unit 202 has a transceiver 208 coupled to the antenna 207 via a radio frequency amplifier 209. The transceiver 208 is also coupled to a combined modulator/demodulator 210 that is coupled to the encoder/decoder 211.

The microprocessor 213 has ports for coupling to the input 206 and to the display screen 205. The microprocessor 213 further has ports for coupling to the microphone 220 and to the communications speaker 222. The character ROM 214 stores code for decoding or encoding data such as control channel messages and/or data or voice messages that may be transmitted or received by the SD 200. In some embodiments of the present disclosure, the static memory 216 can store operating code for the microprocessor 213 that, when executed by the microprocessor 213, perform the SD steps disclosed herein, including one or more of the steps set forth in FIG. 7. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
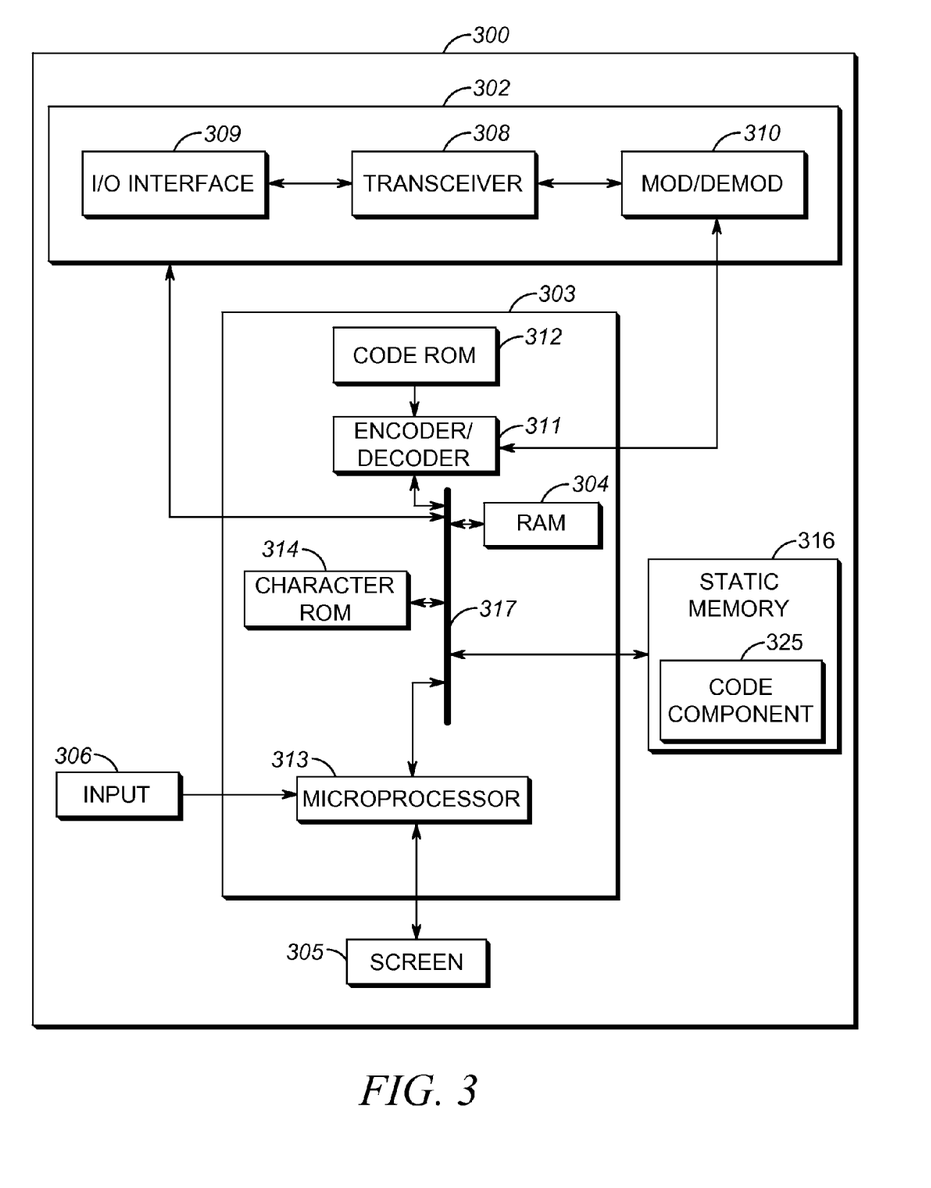
FIG. 3 is a block diagram of a radio controller in accordance with some embodiments.

Referring to FIG. 3, a block diagram illustrates a radio controller 300 used in accordance with some embodiments. The radio controller 300 may be the same or similar to the radio controller 26 of FIG. 1. The radio controller 300 includes a communications unit 302 coupled to a common data and address bus 317 of a processing unit 303. The radio controller 300 may also include an input unit (e.g., keypad, pointing device, etc.) 306 and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received by the radio controller 300. The processing unit 303 may further include a microprocessor 313 coupled, by the common data and address bus 317, to the encoder/decoder 311, a character ROM 314, a RAM 304, and a static memory 316.

The communications unit 302 may include an I/O interface 309 configurable to communicate with network components (for example, a zone controller, database, and/or dispatch console), and other user equipment (for example, SDs) communicatively coupled to the radio controller 300. The communications unit 302 may include one or more broadband and/or narrowband transceivers 308, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 302 may include one or more local area network or personal area network transceivers such as a Wi-Fi transceiver perhaps operating in accordance with an IEEE 802.11 standard (e.g., 802.11a, 802.11b, 802.11g). Additionally or alternatively, the communications unit 302 may include one or more wire-line transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 310 that is coupled to the encoder/decoder 311. The character ROM 314 stores code for decoding or encoding data such as control, request, or instruction messages, and/or auditory or other types of data. Static memory 316 may store operating code associated with distinguishing between mere interference and mass random access events and for taking corresponding action in the infrastructure as a result of the determination, including one or more of the processing steps and/or message transmissions or receptions set forth in FIGS. 4-6.

Static memory 316 may comprise, for example, a HDD, an optical disk drives such as a CD drive or DVD drive, a SSD, a tape drive, a flash memory drive, or a tape drive, to name a few.

Figure 6:
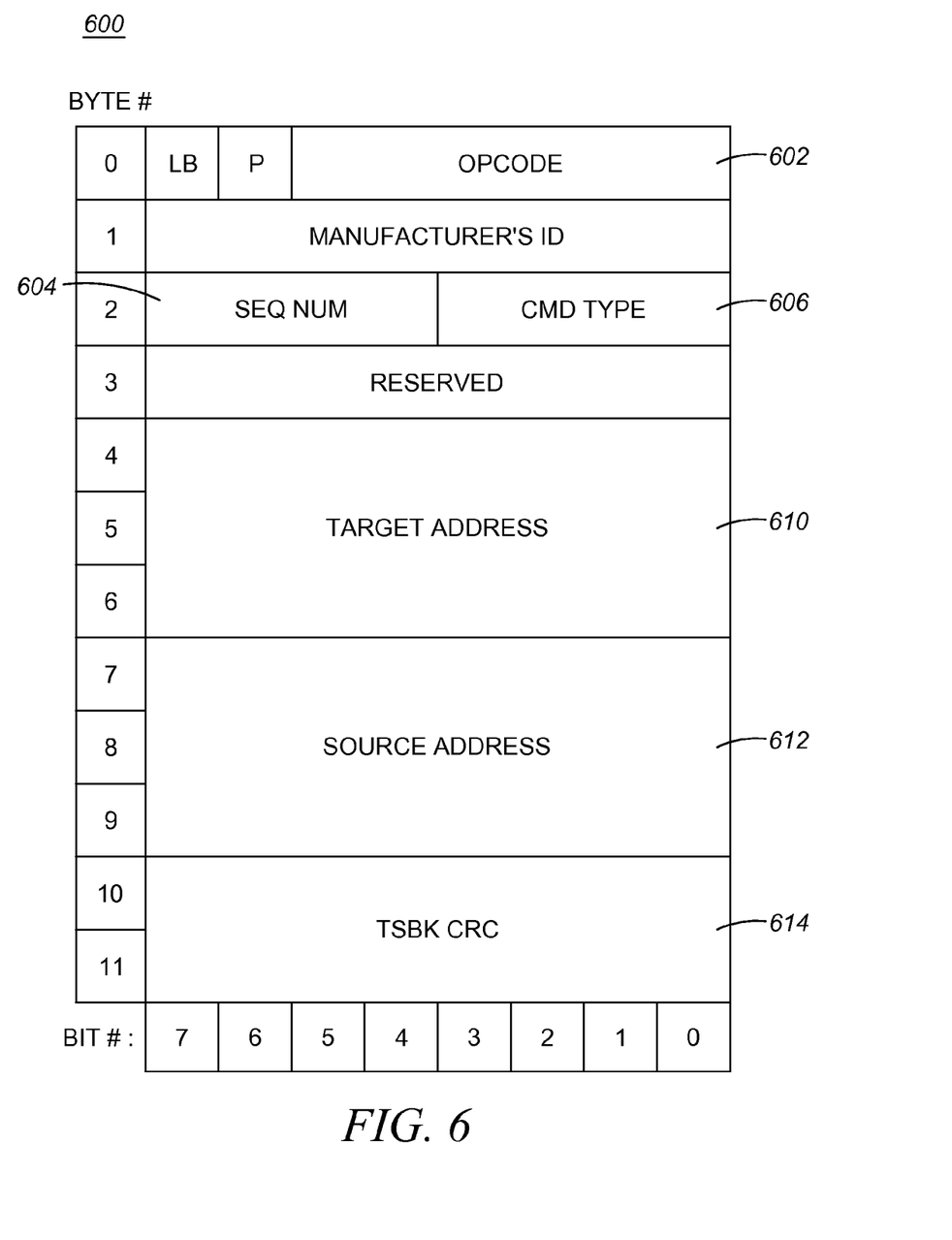
FIG. 6 is a message diagram that indicates an example structure of an emergency acknowledgment incoming signaling packet and/or outbound signaling packet that may be transmitted in the radio access network of FIG. 1 in accordance with some embodiments.
Figure 7:
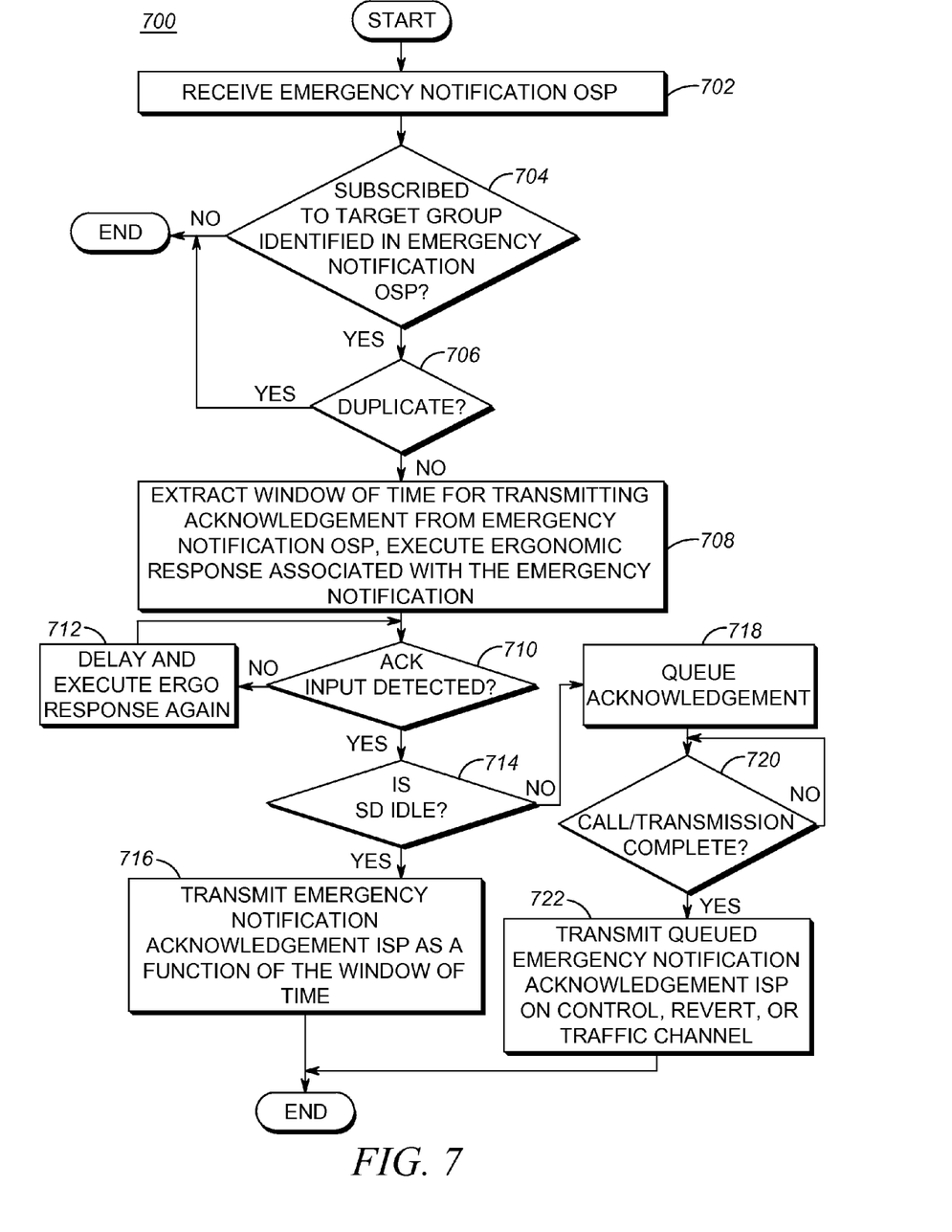
FIG. 7 is a flow diagram illustrating processing steps at the subscriber device of FIG. 2 for managing emergency notifications and acknowledgments in accordance with an embodiment.

2. Processes for Managing Group Based Emergency Notifications and Acknowledgments FIGS. 4-6 set forth a flow diagram 400 and message diagrams 500, 600 illustrating process steps and messages for managing group-based emergency notifications and acknowledgments at a radio controller. FIG. 7 sets forth a flow diagram 700 illustrating process steps for managing group-based emergency notifications and acknowledgments at a SD. Of course, additional steps, receptions, and/or transmissions and various types and structures of messages not disclosed herein could be additionally added before, after, in-between or in place of steps, messages, receptions, and/or transmissions disclosed in FIGS. 4-7, and the presence of such additional or replacement steps, messages, receptions, and/or transmissions would not negate the purpose and advantages of the examples set forth in detail throughout the remainder of this disclosure.

Figure 4:
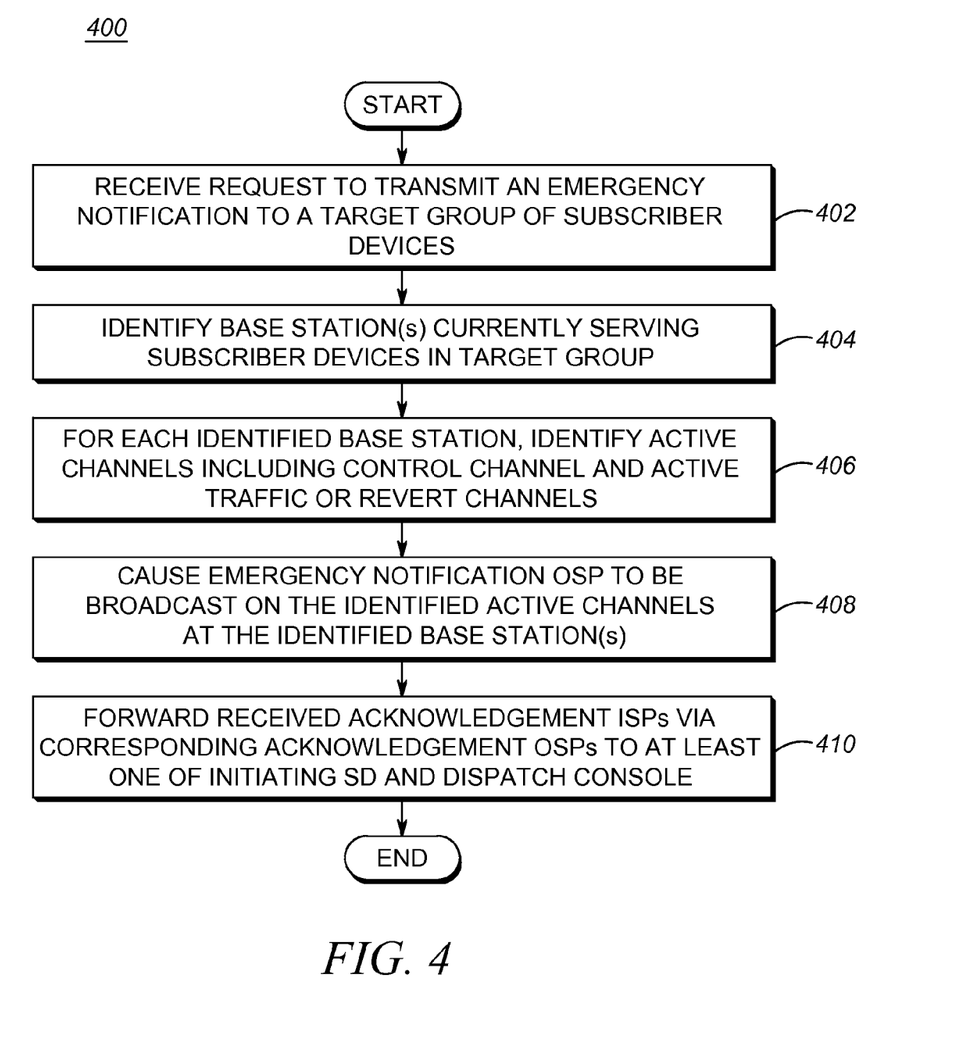
FIG. 4 is a flow diagram illustrating processing steps at the radio controller of FIG. 3 for managing emergency notifications and acknowledgments in accordance with an embodiment.

FIG. 4, in particular, illustrates a process 400 executable at a radio controller, such as the radio controller 300 of FIG. 3, for managing group-based emergency notifications and acknowledgments. At step 402, the radio controller receives a request to transmit an emergency notification to a target group of SDs, the target group being specified in the request. The request may be transmitted by a SD over a control channel of a serving BS and forwarded to the radio controller by the serving BS, or may be transmitted by a dispatch console over a dedicated or shared connection and forwarded to the radio controller via one or more internal or external network routers and/or switches. For example, a dedicated button or combination of buttons on a user interface of a SD in the field, such as a field commander's SD, may allow the field commander, who perhaps gains firsthand or secondhand knowledge of an emergency situation of which notification needs to be acknowledged by each member of a selected/affected group, to cause an emergency notification to be transmitted to all members of the group requesting explicit acknowledgment of receipt of the emergency notification. In some embodiments, a separate computing device such as a laptop or tablet computer may be interfaced with a SD in the field, such as the field commander's SD, and an application running on the separate computing device may operate a group-based notification and acknowledgment function that operates through the SD in the manner described herein in response to a function requested via a keyboard, touch-based, voice-activated, or other input. In still further examples, the requesting device may be located outside of the RAN housing the radio controller that receives the request, and may receive the request via an application programming interface (API) at the radio controller or SD in the field. Other examples are possible as well.

In another example, any user in the field who perhaps gains firsthand or secondhand knowledge of an emergency situation of which notification needs to be acknowledged by each member of a selected/affected group, may radio in to a dispatcher to report the situation, who may then cause an emergency notification to be transmitted to all members of the group requesting explicit acknowledgment of receipt of the emergency notification. Emergency situations may include, for example, an evacuation alert, a hazardous materials alert, a blasting alert, or some other event that is likely to impact the safety of the SD users in the selected/affected group. In other examples, a personnel accountability report may be generated at an emergency site or location so that an accounting of personnel present at an incident can be generated. Other possibilities exist as well.

Figure 5:
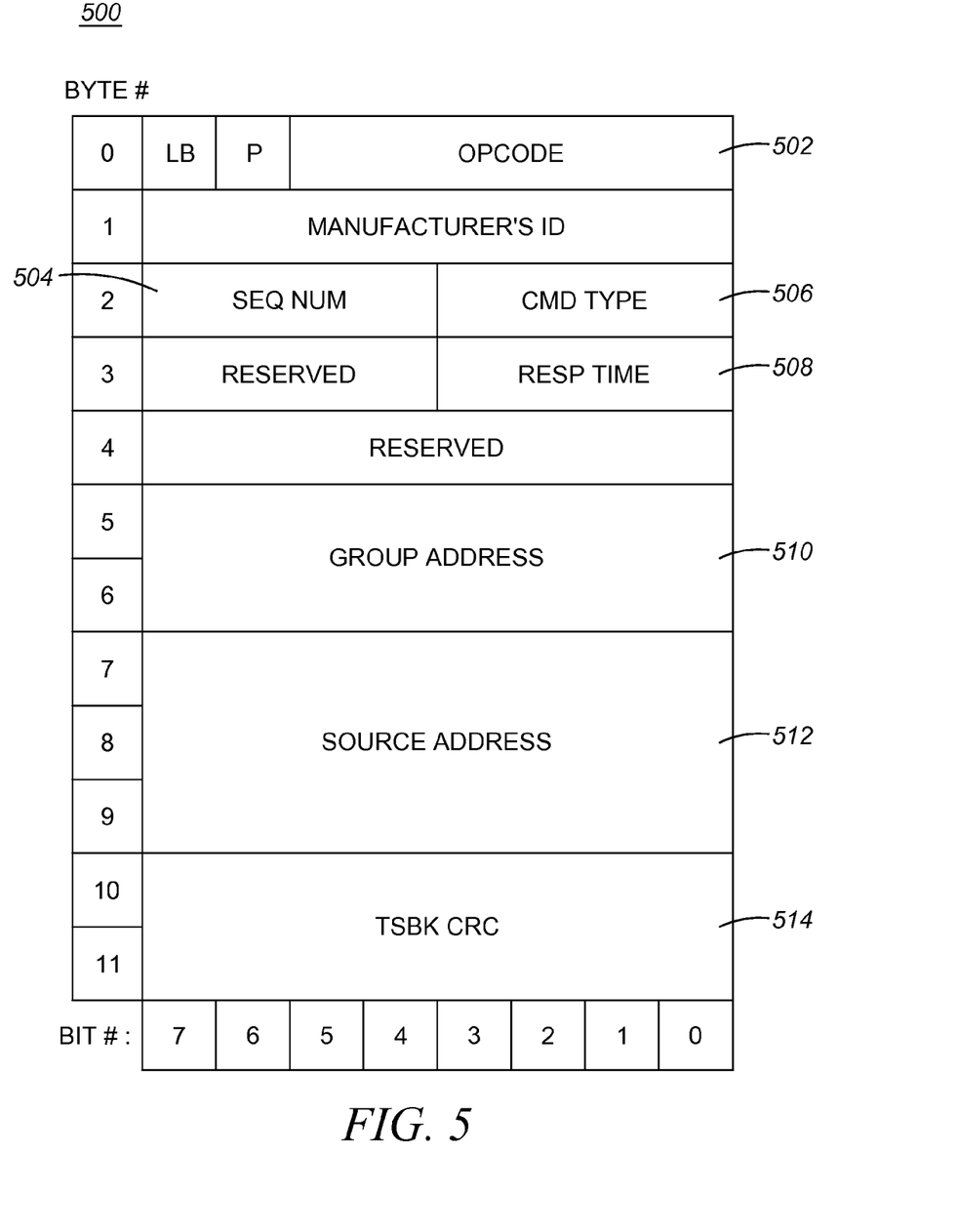
FIG. 5 is a message diagram that indicates an example structure of an emergency notification request incoming signaling packet and/or emergency notification outbound signaling packet that may be transmitted in the radio access network of FIG. 1 in accordance with some embodiments.

An example of a message structure that may be used by a requesting device (SD or dispatch console) as an ISP for requesting the transmission of an emergency notification is set forth in FIG. 5. The emergency notification request message 500 of FIG. 5 is an APCO P25 compliant trunked signaling block (TSBK) that includes several fields extended across 12 ordered octets. The first two fields include a "last block" (LB) field and "protect flag" (PF) field defined in the P25 standard but which are not particularly applicable to this application. An opcode field 502 that defines a function of the message 500 is set to a value associated with an emergency notification request function. The next octet sets forth additional P25 standards-compliant information, including a Manufacturer's/Feature ID field that defines a manufacturer and/or manufacturer feature set, but which is not particularly applicable here. The third octet in the message 500 includes a Sequence Number (Seq Num) field 504 and a Command Type (Cmd Type) field 506. The sequence number is set by the requesting device and is used to uniquely identify a particular set of emergency notifications relating to a single event or request. The sequence number may be a random or pseudo-random number generated anew for each new emergency event, or may be a sequential number that is incremented by some value for each new emergency event, e.g., from a last used sequence number or a last seen sequence number. In this way, the requesting device can send subsequent emergency requests using the same sequence number if acknowledgments have not been received from all members of a target group, and members of the target group that have already transmitted acknowledgments can determine, by comparing the sequence number to previously acknowledged sequence numbers, that they have already replied to the emergency notification and can simply discard such subsequent notifications.

The Command Type is set by the requesting device based on the circumstances surrounding the transmission of the emergency notification request, and may identify the type of emergency, type of ergonomic response required at receiving target group member devices, and/or the priority of the emergency notification. For example, a first value may be associated with an evacuation alert, which may be a highest priority alert (e.g., take precedence over all other alerts) and may cause the highest ergonomic response (e.g., vibrational, auditory, and visual including steady or flashing lights). A second value may be associated with a hazardous materials alert and may be a comparatively lower priority alert and may cause a lower ergonomic response (e.g., an auditory and textual display). Other types of emergency notifications having different priorities and different ergonomic responses are possible as well.

The fourth octet includes a reserved field and a Response Time (Resp Time) field 508. The Response Time field 508 includes a window of time, measured in second, microseconds, milliseconds, etc., in which acknowledgments are to be sent by receiving devices that are members of the target group. In one embodiment, the window of time may be a static preconfigured value set by a system administrator to represent a maximum time for responding to the notification, relative to a particular event such as the receiving SD user depressing the SD's PTT button for a short period of time, and may fall in the range of 1-30 seconds. In still further embodiments, the window of time may vary as a function of one or more determined parameters, such as a total number of users currently affiliated with the target group, a number of users currently affiliated with the target group and operating at one or more BSs in the RAN, a determined number of SDs or groups being serviced by one or more BSs in the RAN, and/or a determined number of SDs or groups currently participating in other emergency notifications being serviced by one or more BSs in the RAN. In order to consider such parameters in setting the value of the window of time, corresponding information would need to be made available to the requesting SD. For example, the requesting SD or dispatch console can track the size of the target group (e.g., the number of active/registered SDs that are subscribed to or associated with the target group) based on information periodically or semi-periodically provided to it by the radio controller or other group membership monitoring device in the RAN. Similarly, information regarding total SDs or total number of groups at each BS in the RAN may also be provided to the requesting SD or dispatch console. The window of time may be set based on a pre-configured multiplier such as 1 second, such that a target group size of 20 SDs results in a window of time value of 20 seconds. In addition to setting forth a maximum time for responding, the window of time may specify a range of time, e.g., 5-35 s, in which to respond, indicating a delay of at least 5 s before a first response could be sent, perhaps allowing time for an ergonomic response to be executed at receiving SDs. Target group SDs receiving the emergency message notification will extract the value of the window of time and generate an individual response time to respond based on (and within) the specified window of time, so that not all target group members are attempting to transmit acknowledgments at a same time, which avoids collisions on the control or other channel on which the acknowledgments are transmitted.

In other embodiments, the size of target groups may be pre-configured at an expected maximum or average amount of users expected in the target group, and the requesting device may set the value of the window of time based on the pre-configured size and pre-configured multiplier.

The fifth octet of message 500 is reserved. The sixth and seventh octets form a group address field 510 that identifies the target group of SDs by its group identifier. In some embodiments, the group address may be an index number. For example, a group of SDs forming a police unit may be assigned a group address of "1", while a group of SDs forming a fire department unit may be assigned a group address of "2." In other embodiments, the group address may be a numeric or alphanumeric address or may take the form of a color code. Other possibilities exist as well. In any event, SDs receiving an emergency notification message will extract the group address from the group address field 510 and compare the group address to groups it is associated with and/or subscribed to. If a match is found, the SD will further process and act on the emergency notification message, and if no match is found, the SD will discard the emergency notification message.

The eighth-tenth octets of message 500 form a source address field 512 that identifies the source of the emergency notification request message 500 (e.g., the original source transmitting device). The source address in the source address field 512 may be an International Mobile Subscriber Identity (IMSI) of the requesting device, a hardware MAC address, a serial number, an IP address, or some other unique identifier that can be used to identify the source of the message 500.

The last field in the message 500 may be a cyclic-redundancy-check (CRC) field 514 that includes a CRC value for use by receiving SDs in verifying that the message 500 has been received in an error-free state.

Returning to FIG. 4, at step 404, the radio controller extracts the target group address from the received request and identifies the one or more base stations serving SDs associated with or subscribed to the target group identified by the extracted target group address. The radio controller may maintain, or have access to, a database of registered SDs (e.g., active SDs that have registered with the system to receive wireless communications services via one or more BSs in the communication system) that also identifies associated target groups with which each registered SD is associated or subscribed. As set forth earlier, these associations or subscriptions may be statically defined or dynamically updated. Using this information, the radio controller can determine which BSs are currently serving registered SDs of the target group.

At step 406, and for each BS identified as currently serving a registered SD of the target group, the radio controller identifies active channels including one or more of a control channel and active traffic and/or revert channels. In some embodiments, different BSs in a system will use entirely different and non-overlapping channels to avoid interference. In other embodiments, different BSs in a system that are determined to be geographically distant from one another may re-use one or more same channels (e.g., the same channel and/or time slot parameters but physically different from the same channel and/or time slot being used in a geographically distant BS). As set forth earlier, in a trunked system, the control channel is the channel on which SDs idle and await new call notifications and receive and/or transmit other types of control signaling. Traffic channels are separate channels that are dedicated to voice and/or data traffic for the duration of a requested call only, and then are returned to the pool of available channels after completion of the call. Still another channel that may exist at a BS is a data revert channel, which may be used by SDs to transmit location or other information to the infrastructure on a dedicated data channel. When identifying active channels at each BS serving a registered SD of the target group, the radio controller may identify all active channels at a BS, including control, traffic, and/or data revert channels. In this way the radio controller can identify the universe of all channels on which a possible target group SD member could possibly be residing, even if only temporarily (e.g., for a call or transmission, or during a channel scan).

At step 408, the radio controller causes an emergency notification outbound signaling packet (OSP) to be transmitted on each of the active channels identified at step 406. In the case of the control channels at respective BSs, the radio controller may cause a TSBK OSP having a structure substantially similar to that set forth in FIG. 5 to be transmitted on an available outbound control channel identified at step 406 at each BS identified in step 404. In other embodiments, the radio controller may modify the contents of the request, and/or remove or add additional fields or information, in forming the TSBK OSP emergency notification corresponding to the receiving TSBK ISP emergency request. In the case of traffic channels carrying auditory or other types of data, the radio controller may cause an embedded link control (embedded LC) packet (e.g., embedded in a separate voice or data signal), standalone LC, or media access control (MAC) message to be embedded within the auditory or other type of data on the outbound traffic channel identified at step 406 at each BS identified in step 404. In the case of data revert channels, the radio controller may cause a TSBK OSP substantially similar to that set forth in FIG. 5 to be transmitted in an available outbound data revert channel normally used for scheduling the corresponding uplink data revert channel, identified at step 406 at each BS identified in step 404.

While the emergency notification OSP caused to be transmitted on the identified channels at step 408 may differ from the emergency notification request message 500 structure set forth in FIG. 5, it includes at least the following information included in the request message: the sequence number, the command type, the response time, and the group address. Additional information specified in the emergency request message as well as other information not specified in the emergency notification request message may be included as well.

After transmitting the emergency notification OSP at step 408, the radio controller awaits acknowledgments from target group member SDs acknowledging receipt of the emergency notification. Acknowledgment requires some manipulation of a user interface at the target group member SD that indicates that the user of the SD has received the emergency notification, after which time a corresponding acknowledgment message identifying the acknowledging radio is transmitted over-the-air to the SD's serving BS and which is then forwarded to the radio controller. An example of a message structure useful for acknowledging receipt of the emergency notification is set forth in FIG. 6. The message structure set forth in FIG. 6 is described with respect to an emergency acknowledgment incoming signaling packet (ISP) originating from an acknowledging SD and received at the radio controller, but a same or similar message structure may be used in a corresponding emergency acknowledgment OSP transmitted from the radio controller to the originating/requesting device (e.g., the dispatch console or initiating SD).

The message 600 of FIG. 6 is, again, an APCO P25 compliant TSBK message that includes several fields extended across 12 ordered octets. The first two fields include a "last block" (LB) field and "protect flag" (PF) field defined in the P25 standard but which are not particularly applicable to this application. An opcode field 602 that defines a function of the message 600 is set to a value associated with an emergency notification acknowledgment function. The next octet sets forth additional P25 standards-compliant information, including a Manufacturer's/Feature ID field that defines a manufacturer and/or manufacturer feature set, but which is not particularly applicable here. The third octet in the message 600 includes a Sequence Number (Seq Num) field 604 and a Command Type (Cmd Type) field 606. The sequence number is set by the acknowledging device and is used to uniquely identify the particular emergency event or request being acknowledged (e.g., the sequence number placed in the Sequence Number field 604 is the same as the sequence number the acknowledging device received in a corresponding emergency notification message 500 Sequence Number field 504). Similarly, the Command Type is set by the acknowledging device and may also be used to uniquely identify the particular emergency event or request being acknowledged (e.g., the command type placed in the Command Type field 606 is the same as the command type the acknowledging device received in the corresponding emergency notification message 500 Command Type field 506).

The fourth octet includes a reserved field. The fifth-seventh octets form a target address field 610 that identifies the target address of the message 600 (e.g., which in most embodiments will be the address or identity of the original requesting device that sent the emergency notification request message 500 and whose address appears in the source address field 512 of the emergency notification request message 500, and may include a requesting SD or requesting dispatch console).

The eighth-tenth octets form a source address field 612 that identifies the source of the message 600 (e.g., the SD device transmitting the message 600). The source address in the source address field 512 may be an IMSI of the acknowledging device, a hardware MAC address, a serial number, an IP address, or some other unique identifier that can be used to identify the transmitter of the emergency notification acknowledgment message 600.

The last field in the message 600 may be a CRC field 614 that includes a CRC value for use by receiving devices in verifying that the message 600 has been received in an error-free state.

Returning to FIG. 4, in the event that the initiating/requesting device does not receive acknowledgments from all registered SDs of the target group specified in the request, it may re-send the emergency notification request message 500 with the same sequence number and command type as before, but perhaps with a lower window of time given that those registered SDs that have already acknowledged receipt of the emergency notification message will not need to do so a second or subsequent time (e.g., the window of time in subsequent messages may be based on the remaining number of registered but un-acknowledged SDs in the target group, instead of the total number of SDs in the target group). In response to receiving a re-sent emergency notification request message, and due to the mobility of SDs and the possibility that active calls have ended, the radio controller may re-execute steps 402-410 using the parameters of the re-sent emergency notification request message 500. Further subsequent re-sent emergency notification request messages could be handled in a same or similar manner.

Turning now to FIG. 7, this flow diagram illustrates an example process 700 executable at a SD, such as the SD 200 of FIG. 2, for managing group-based emergency notifications and acknowledgments at a receiving SD device. At step 702, a SD receives an emergency notification OSP over-the-air via its serving BS. The emergency notification OSP could be in a form similar to that of the message 500 set forth in FIG. 5.

At step 704, the SD determines if it is an intended recipient of the emergency notification, e.g., whether it is subscribed to or associated with the target group identified in the received emergency notification OSP. If the receiving SD determines that it is not currently subscribed to or associated with the target group identified in the received emergency notification OSP, the receiving SD discards the notification and process 700 ends. If, on the other hand, the receiving SD determines that it is currently subscribed to or associated with the target group identified in the received emergency notification OSP, processing proceeds to step 706.

At step 706, the SD determines whether the emergency notification OSP received at step 702 is a duplicate of an earlier received emergency notification OSP that has already been acknowledged by the SD. As set forth earlier, a unique sequence number included in the emergency notification OSP may be used to identify a particular emergency event or instruction to be acknowledged. Other methods of identifying duplicates could be used as well. If the emergency notification OSP is identified as a duplicate at step 706, the emergency notification OSP is discarded and process 700 ends. If, on the other hand, the emergency notification OSP is not identified as a duplicate, processing proceeds to step 708.

At step 708, the SD extracts a window of time for transmitting an emergency notification acknowledgment from the emergency notification OSP, and executes an ergonomic response associated with the emergency notification OSP. As indicated earlier, the ergonomic response may take the form of a mechanical/vibrational response, an auditory response (e.g., digital audio playback of pre-recorded audio, playback of pre-recorded or dynamically created tones, etc.), and/or a visual (e.g., textual display screen, steady or periodic light emissions from LEDs, etc.) response. The particular ergonomic response performed may be explicitly indicated in the emergency notification OSP, or may be derived from the emergency notification OSP. For example, an "evacuation" command type indicated in a command type field of the emergency notification message may be used at the SD to access a local ergonomic response mapping to determine what type or combination of ergonomic responses to provide at the SD for the specified "evacuation" command.

At step 710, the SD determines whether an acknowledgment input was detected at the SD. For example, a short press (e.g., a press of under 750 ms) of a PTT button on a user interface of the SD, such as a user interface included in the input 206 of SD 200 of FIG. 2, may be used to indicate a user's acknowledgment of the emergency notification and the corresponding executed ergonomic response. Additionally or alternatively, other input elements could be used to indicate acknowledgment as well. If an input indicative of acknowledgment has not yet been detected, processing passes to step 712, where the ergonomic response is continuously or periodically executed, before proceeding back to step 710 to again check to see if an input indicative of acknowledgment has been detected.

On the other hand, if an input indicative of acknowledgment is detected at step 710, processing proceeds to step 714, where the SD determines whether it is idle. Idle in this context means that the SD is idling on the control channel and is not transmitting or receiving voice or data, from or to another device, on a traffic channel in the trunked communications system, and is not transmitting data on a revert channel in the trunked communications system.

If it is determined at step 714 that the SD is currently idle, processing proceeds to step 716, where the SD transmits an emergency notification acknowledgment ISP, perhaps using the data structure of the emergency notification acknowledgment message 600 of FIG. 6, on the control channel as a function of the window of time extracted in step 708. For example, the SD may calculate a random number R between 0 and 1 and multiply the random number R times the window of time. Where the random number R is 0.5 and the window of time is 20 s, the SD may determine to transmit its acknowledgment at or near a time of 10 s relative to a pre-configured event (such as the receipt of the OSP at step 702 or detection of the ACK input at step 710) or particular event specified in the emergency notification OSP in an FDMA or CDMA system or in a time slot occurring at or near the time of 10 s in a TDMA system. For example, the SD may set a window of time timer using the window of time value from the emergency notification OSP, start the timer at detection of the pre-configured or specified event, and transmit the emergency notification acknowledgment ISP at step 716 upon expiration of the window of time timer.

Using the example values above, the SD transmits the emergency notification acknowledgment ISP on the control channel of its serving BS approximately 10 s after detecting the PTT button short press of step 710. In other embodiments, the SD may instead transmit the emergency notification acknowledgment ISP on a data revert channel or an available assigned or un-assigned traffic channel associated with its serving BS and/or its target group.

Returning to step 714, if the SD alternatively determines that it is not currently idle, but instead is currently involved in a voice or data call on a traffic or revert channel, processing proceeds to step 718, where it queues the emergency notification acknowledgement ISP for later transmission. At step 720, the SD determines if the voice or data call or data revert transmission has been completed, and if so, proceeds to step 722. While in the loop at step 720, the SD may suspend the window of time timer that was initiated relative to the pre-configured event (such as the receipt of the OSP at step 702 or detection of the ACK input at step 710) or particular event specified in the emergency notification OSP, or the SD may reset the window of time timer every time it expires back to its original time.

At step 722, the SD transmits the queued emergency notification acknowledgment ISP, perhaps using a same or similar message structure as message 600 of FIG. 6, via its serving BS. In some embodiments, the SD may transmit the queued emergency notification acknowledgment ISP at 722 immediately after the call/transmission is complete, while in other embodiments, it may wait until the window of time timer (suspended or reset at step 720) expires. The SD may transmit the queued acknowledgment on the same voice or data channel on which it was operating on at step 714 (e.g., traffic or data revert channel, if available), or may return to the control channel and transmit the queued acknowledgment on its serving BS's control channel.

3. Conclusion

In accordance with the foregoing, an improved method and apparatus ids disclosed for managing group-based emergency notifications and acknowledgments in a trunked RAN. As a result, a more robust, useful, and efficient group emergency notification system can be provided, improving communication capabilities and services provided to incident response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing group-based emergency notifications and acknowledgments, the method comprising:
   receiving, at a radio controller, a request to transmit an emergency notification with acknowledgment to an identified target group of subscriber devices;
   identifying, at the radio controller, one or more base stations actively serving the subscriber devices associated with the identified target group;
   identifying, at the radio controller and for each of the identified one or more base stations, all active channels across every one of the identified one or more base stations including at least a first active control channel associated with a first one of the identified one or more base stations and a first active voice or data channel associated with the first one of the identified one or more base stations;
   causing, by the radio controller, an emergency notification outbound signaling packet (OSP), requesting individual acknowledgment and identifying the identified target group of subscriber devices, to be broadcast on the identified all active channels.

2. The method of claim 1, further comprising, for each acknowledgment incoming signaling packet (ISP) received in response to the emergency notification OSP, at the radio controller, forwarding a corresponding acknowledgment OSP to one of a same initiating subscriber device that transmitted the request and a dispatch console.

3. The method of claim 2, wherein an active call is in progress on an assigned second active voice channel for the identified target group at a second one of the identified one or more base stations, the method further comprising the radio controller receiving respective acknowledgment ISPs from at least a subset of the subscriber devices in the identified target group on one of a second active control channel and the second active voice channel of the second one of the identified one or more base stations after the active call is completed.

4. The method of claim 1, wherein the emergency notification request is transmitted by an initiating subscriber device comprising one of a dispatch unit and a subscriber device that is also a member of the identified target group.

5. The method of claim 1, further comprising determining a window of time parameter for use by the subscriber devices in the identified target group in calculating an acknowledgment response, and including the determined window of time parameter in the emergency notification OSP.

6. The method of claim 5, wherein the window of time parameter is determined, by the radio controller, by extracting the window of time parameter from the request or other subsequent packet received subsequent to the request but associated with the request.

7. The method of claim 5, wherein the window of time parameter is calculated, by the radio controller, as a function of a determined number of subscriber devices in the identified target group.

8. The method of claim 1, wherein the step of identifying all active channels across every one of the identified one or more base stations further comprises identifying an active data revert channel associated with the first one of the identified one or more base stations.

9. The method of claim 1, wherein the request includes a unique sequence number that is also included in the emergency notification OSP and, responsive to a failure of a particular subscriber device in the identified target group of subscriber devices to transmit an acknowledgment to the emergency notification OSP, the radio controller causing a subsequent emergency notification OSP, including the request for individual acknowledgment and identifying the identified target group of subscriber devices, to be broadcast on the identified all active channels, the subsequent emergency notification OSP including the same unique sequence number.

10. The method of claim 1, wherein causing the emergency notification OSP to be broadcast on the identified all active channels further comprises causing the emergency notification OSP to be broadcast in a trunked signaling block on the first active control channel at the first one of the identified one or more base stations and causing the emergency notification OSP to be broadcast in an embedded link control message on the at least one first active voice or data channel associated with the first one of the identified one or more base stations.

11. The method of claim 1, wherein the request includes a command type that indicates an ergonomic response to be provided at each subscriber device in the identified target group of subscriber devices, and the method further comprises the radio controller including the command type in the emergency notification OSP.

12. A radio controller in a radio system, the controller comprising:
   a transceiver;
   a data store; and
   one or more processors configured to:
      receive, via the transceiver, a request to transmit an emergency notification with acknowledgment to an identified target group of subscriber devices;
      identify one or more base stations actively serving the subscriber devices associated with the identified target group;
      identify, for each of the identified one or more base stations, all active channels across every one of the identified one or more base stations including at least a control channel associated with a first one of the identified one or more base stations and an active voice or data channels associated with the first one of the identified one or more base stations;

cause, via the transceiver, an emergency notification outbound signaling packet (OSP), requesting individual acknowledgment and identifying the identified target group of subscriber devices, to be broadcast on the identified all active channels.

13. The radio controller of claim 12, wherein the processor is further configured to, for each acknowledgment incoming signaling packet (ISP) received in response to the emergency notification OSP, forward, via the transceiver, a corresponding acknowledgment OSP to one of a same initiating subscriber device that transmitted the request and a dispatch console.

14. The radio controller of claim 12, wherein the processor is further configured to determine a window of time parameter for use by the subscriber devices in the identified target group in calculating an acknowledgment response, and including the determined window of time parameter in the emergency notification OSP.

15. The radio controller of claim 14, wherein the processor is configured to determine the window of time parameter by extracting the window of time parameter from the request or other subsequent packet received subsequent to the request but associated with the request.

16. The radio controller of claim 14, wherein the processor is configured to calculate the window of time parameter as a function of a determined number of subscriber devices in the identified target group.

17. The radio controller of claim 12, wherein the processor is configured to identify all active channels across every one of the identified one or more base stations by further identifying an active data revert channel associated with the first one of the identified one or more base stations.

18. The radio controller of claim 12, wherein the request includes a unique sequence number that is also included in the emergency notification OSP, and the radio controller is further configured to, responsive to a failure of a particular subscriber device in the identified target group of subscriber devices to transmit an acknowledgment to the emergency notification OSP, cause, via the transceiver, a subsequent emergency notification OSP, including the request for individual acknowledgment and identifying the identified target group of subscriber devices, to be broadcast on the identified all active channels, the subsequent emergency notification OSP including the same unique sequence number.

19. The radio controller of claim 12, wherein the processor is further configured to cause the emergency notification OSP to be broadcast on the identified all active channels by causing the emergency notification OSP to be broadcast in a trunked signaling block on the first active control channel at the first one of the identified one or more base stations and causing the emergency notification OSP to be broadcast in an embedded link control message on the at least one first active voice or data channel associated with the first one of the identified one or more base stations.

* * * * *